No. 676,675. Patented June 18, 1901.
W. P. DAVIS.
SHAFT COUPLING.
(Application filed Dec. 1, 1900.)
(No Model.)

Witnesses
C. G. Crannell
J. A. Culver

Inventor
Wm. P. Davis,
By Geo. B. Selden,
Attorney

UNITED STATES PATENT OFFICE.

WILLIAM P. DAVIS, OF ROCHESTER, NEW YORK.

SHAFT-COUPLING.

SPECIFICATION forming part of Letters Patent No. 676,675, dated June 18, 1901.

Application filed December 1, 1900. Serial No. 38,294. (No model.)

*To all whom it may concern:*

Be it known that I, WILLIAM P. DAVIS, a citizen of the United States, residing at Rochester, New York, have invented an Improved Shaft-Coupling, of which the following is a specification, reference being had to the accompanying drawings.

My invention relates to an improved shaft-coupling by which the adjoining ends of pieces of shafting are coupled together in perfect alinement by friction without the employment of keys or screws in a simple, cheap, and efficient manner.

My invention is fully described and illustrated in the following specification and the accompanying drawings, the novel features thereof being specified in the claims annexed to the said specification.

Figure 1:
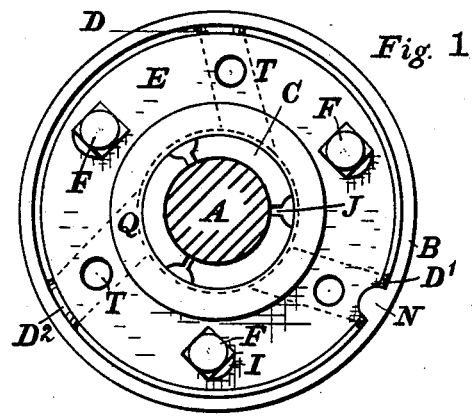
Figure 2:
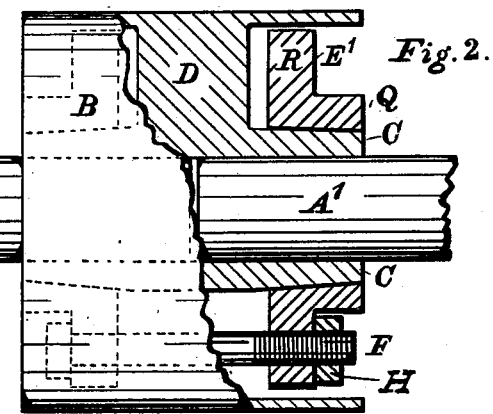
Figure 3:
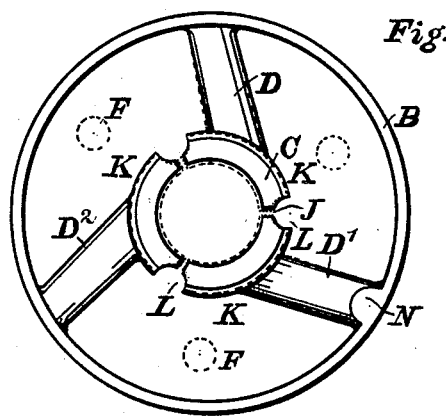
Figure 4:
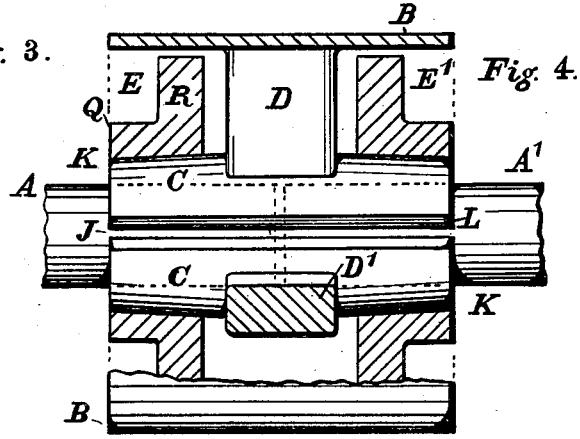
Figure 5:
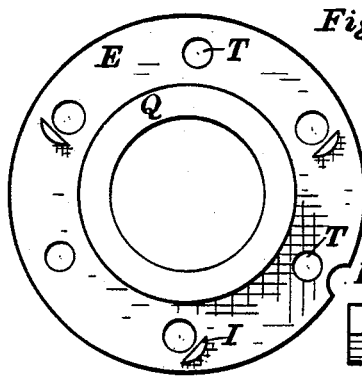
Figure 6:
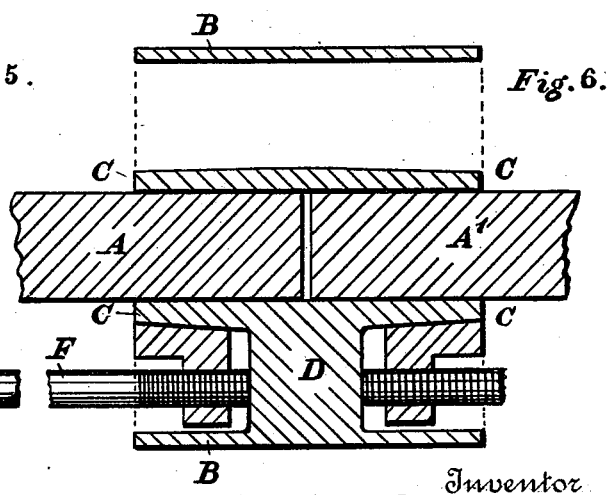

In the accompanying drawings, representing a shaft-coupling embodying my invention, Figure 1 is an end view. Fig. 2 is a side elevation partially broken away and in section. Fig. 3 is an end view of the body of the coupling. Fig. 4 is a side elevation, a portion of the shell next the observer being broken away to show the divided hub and the radial arms. Fig. 5 is an end view of one of the conical clamps detached. Fig. 6 is a longitudinal section showing the manner of detaching the coupling from the shaft.

The construction and mode of operation of my improved shaft-coupling will be understood from the accompanying drawings.

A A' represent the portions of shafting to be coupled; B, the outer shell or rim of the coupling; C, the longitudinally-divided hub; D D' D², the angularly-disposed arms, and E E' the conical clamps. The ends of the divided hub project laterally beyond the angularly-disposed arms, and they are tapered or made conical, as represented in Figs. 2 and 4. I have found in practice that a suitable taper is one in sixteen. The clamps E E' are given a corresponding taper and fitted on the conical ends of the hub, and the clamps are forced inward or drawn together by screws, bolts, or other suitable means, so that the hub is compressed and firmly seated on the shafts. In the arrangement shown the clamps are drawn together by two or more screws F, passing through the clamps and between the arms, the preferable construction being to provide the screws with a head at one end and a nut H, Fig. 2, at the other.

I represents lugs on the outside of the clamps to prevent the screws from turning around. The hub is divided longitudinally by the slits J into two or more segments K, bored internally to correspond with the shaft and tapered on the outside of their laterally-projecting ends, as already mentioned. It will of course be understood that the conical openings in the clamps are properly proportioned, so that the segments will be compressed to a suitable degree on the shaft when the clamps are forced home. Grooves L in the outer surface of the hub, opposite the slits J, facilitate the cutting of the slits. Each segment K of the divided hub is attached to one of the angularly-disposed arms D, which are disposed at an angle with the radius to facilitate the compression of the hub. The inward movement of the segments when the hub is compressed is indicated by the dotted lines in Fig. 3. It will, however, be understood that in certain forms of construction the friction may be secured by the flexure of the segments or even by that of the outer shell, which preferably incloses and protects the coupling and which may be of any suitable dimensions, sometimes being utilized as a pulley, if desired. The shell, arms, and hub may be cheaply and conveniently cast in one piece, a small amount of machine-work then fitting the body of the coupling for application in practice. The slits are made in any suitable way—such, for instance, as the employment of a key-seating machine.

N represents lugs on the inside of the shell, which fit notches P, Fig. 5, in the edges of the clamps, so as to compel the proper alinement of the clamps in respect to each other. The clamps consist of the internally-conical collars Q and the flanges R.

In order to provide for removing the coupling, I drill and tap a series of holes T in the flanges of the clamps in line with the arms D D' D², and the screws F having been removed one or more of them is screwed into the threaded hole or holes T until the point bears on one of the arms, and the pressure thus produced draws the clamp off the hub and releases the shaft from the coupling.

My improved shaft-coupling may be made of any suitable shape or proportions adapted to the sizes of all the shafting commonly used.

I claim—

1. In a shaft-coupling the combination with the outer shell, of angularly-disposed arms secured to said shell, a divided hub, comprising tapering segments, each of said segments being secured to one of the angularly-disposed arms, and means for contracting said segments.

2. In a shaft-coupling, the combination with the outer shell, of angularly-disposed arms secured to said shell, exteriorly-tapered hub-segments secured to the ends of said arms forming a hub having flexible ends, and conical clamps engaging said hub for contracting the flexible ends, substantially as described.

3. In a shaft-coupling the combination with the outer shell, of a longitudinally-slit hub composed of two or more tapering segments supported by angularly-disposed arms within said outer shell, grooves formed in said segments adjacent the slit portion of the hub, and clamps adapted to be forced over the flexible portion of the hub for contracting the same, substantially as described.

4. In a shaft-coupling the combination with the outer shell, of angularly-disposed arms secured to said shell, exteriorly-tapered hub-segments secured to the ends of said arms, clamps adapted to engage said hub-segments, notches formed in said clamps, shoulders on the interior of said shell for engaging said notches, and bolts passing through said clamps for operating the clamps, substantially as described.

WILLIAM P. DAVIS.

Witnesses:
GEO. B. SELDEN,
C. G. CRANNELL.